Jan. 4, 1927.
R. T. ROBERSON
SNUBBING SHOCK ABSORBER
Filed March 29, 1926
1,613,198
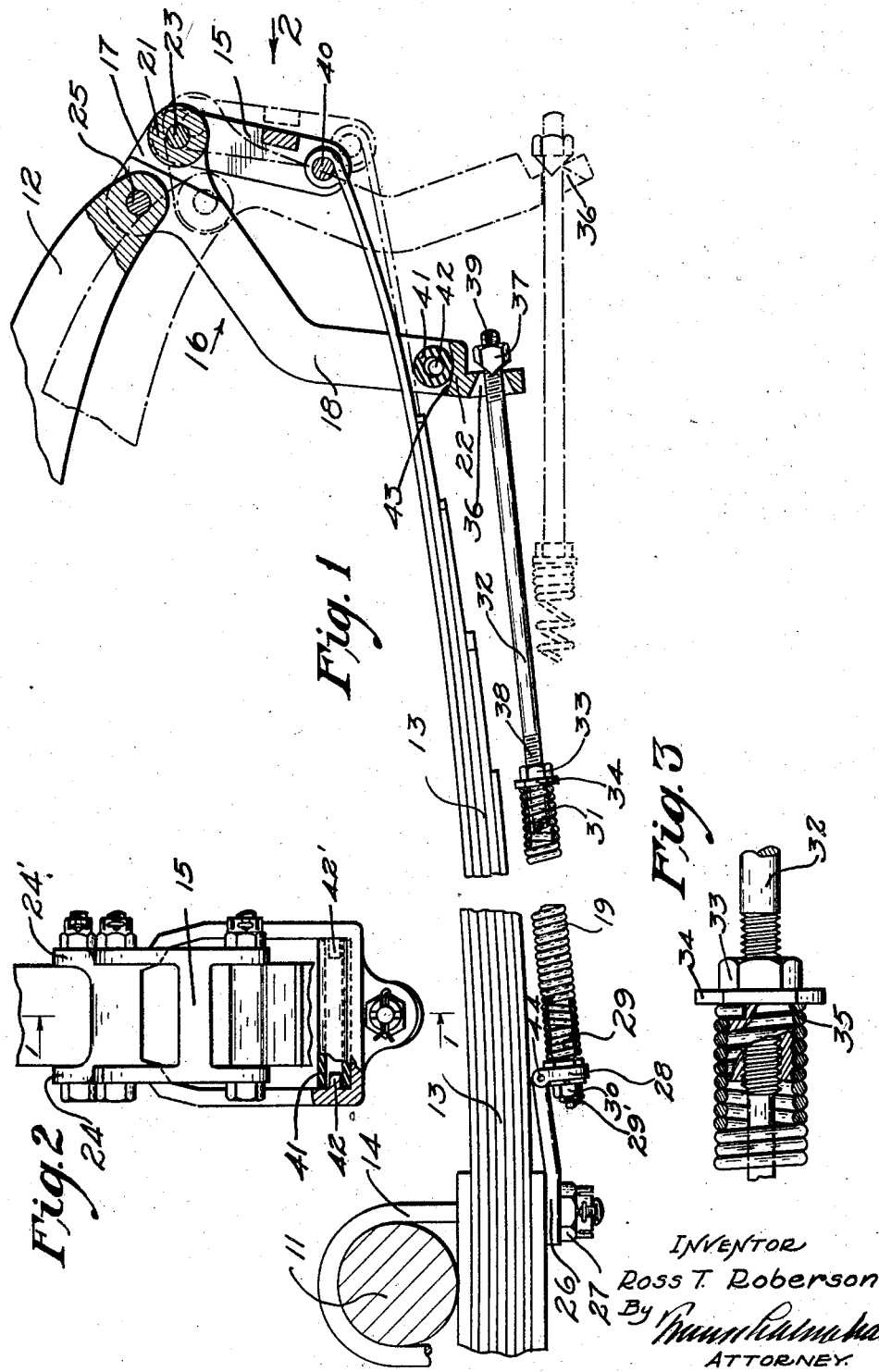
INVENTOR
Ross T. Roberson
By
ATTORNEY Patented Jan. 4, 1927.

1,613,198

UNITED STATES PATENT OFFICE.

ROSS T. ROBERSON, OF SOUTH TAFT, CALIFORNIA.

SNUBBING SHOCK ABSORBER.

Application filed March 29, 1926. Serial No. 98,104.

As may be inferred from the above title, this invention relates particularly to devices, suitable for use on automobiles of various current makes to supplement and to improve the action of the springs, such as elliptical or semi-elliptical springs, as commonly provided between the axles and frames of such vehicles.

It is an object of my invention to provide intermediate members, in the form of levers, suitable to be inserted between, for example, the downwardly inclined horns which are secured to or integral with the frame or chassis of a motor vehicle and the end of upwardly curved leaf springs therebelow; and, in preferred embodiments of my invention, the shackles originally provided by the manufacturer of the car may be simply disconnected, as by the removal of a horizontal pin, from the mentioned horns (or from equivalent frame elements) and attached, in each case, to the outer ends of a short arm of an interposed lever,—this lever being pivoted at a point from which the shackle has been disconnected and provided not only with the mentioned short arm (which may be regarded as constituting a flexible extension of the mentioned horn) but also with a longer and downwardly and inwardly inclined arm provided with resilient restraining means and with a buffer or snubbing member.

Other objects of my invention, including the use of a lever comprising substantially parallel side elements spaced apart sufficiently to permit the end of an elliptical or semi-elliptical spring freely to play therebetween, and comprising also transverse members at the respective ends thereof and upwardly projecting ears between which the ends of a horn, integral with a frame, may closely interfit,—and optionally comprising also special means favorable to the utilization of a tension spring in restraining the downward movements of the longer arm of the mentioned lever—may be best appreciated from the following description of an illustrative embodiment of my invention, taken in connection with the appended claims and the accompanying drawings, in which Fig. 1 may be referred to as a side elevational view, with parts broken away, substantially as indicated by the line 1—1 of Fig. 2.

Fig. 2 is an end view, taken substantially as indicated by the arrow 2 of Fig. 1, but on a slightly reduced scale.

Fig. 3 is a detail view, showing a preferred mode of attaching a spring to a rod, for use in restraining the outward movement of a downwardly extending lever arm, as hereinafter described.

Referring to the details of that specific embodiment of my invention chosen for purposes of illustration, 11 being a vehicle axle and 12 being a horn or similar member integral or rigidly connected with a vehicle frame, and 13 being a semi-elliptical spring shown as secured by a U bolt 14 to the axle 11, the respective ends of this spring being connected with horns 12 or with equivalent frame elements, by means including shackles 15, my invention comprises special levers 16 each having a shorter arm 17 and a longer arm 18, the former being connected with said shackles and the latter being restrained, in its outward movements toward a position indicated in dotted lines, by means such as a spring 19.

In the form of my invention illustrated, the mentioned arms 17 and 18, both being normally inclined downward, comprise side elements spaced apart sufficiently to permit the spring 13, or its equivalent, freely to move therebetwen,—the ends of the respective side elements referred to being shown as integral with transverse members 21 and 22.

The transverse member 21 is shown as substantially circular in cross sectional outline and as provided with a central opening adapted to receive a pin 23, by which it may be pivotally connected with the upper end of a shackle 15; and this may be the identical pin originally provided for the attachment of the shackle to the horn 12, or its equivalent. The respective side elements of the lever 16 being shown as provided with apertured ears 24, 24' spaced apart sufficiently to permit the interposition of the horn 12 therebetween, upon the disconnection of a shackle 15 from said horn, a pin or bolt 25, which may be of substantially the same type as the mentioned pin or bolt 23, may be employed to attach the lever 16 in the general manner shown—the horizontal distance or inner diameter between the ears 24, 24' being substantially the same as the outside diameter of the mentioned transverse member 21.

The inner end of the spring 19, shown as a tension spring, may be secured to a fixed member, such as the U bolt 14, in any suitable way, as by the interposition of a bent or two-part bracket 26 above a nut 27,—a downwardly extending and apertured end 28 of this bracket being shown as engaged by a spirally channeled attachment member 29, about which one end of the spring 19 is closely wrapped and resiliently held,—the opposite end 29' of this attachment member being shown as threaded to carry a nut 30. The other end of the spring 19, or its equivalent, may be similarly connected with a spirally channeled attachment member 31, into which may be threaded a rod 32, and either said attachment member or said rod may carry a lock nut 33, shown as contacting with a hexagonal washer or plate 34, engaging a shoulder 35 at one end of the said attachment member. The transverse member 22 at the lower end of the longer arm 18 of lever 16 is shown as provided with a substantially conical aperture 36, to receive and permit limited relative movement of the rod 32; and this rod, shown as carrying a turreted nut 37, may be provided at one or both of its ends with threads such as are shown at 38 and 39, to facilitate adjustment of the tension of the spring 19 and to predetermine the directions in which the respective arms 17 and 18 of the lever 16 normally extend under the intended load.

It will be noted that, assuming the normal range of movement of the lever 16 to lie between that position in which it is shown in full lines and a second position such as that in which it is shown in dotted lines, the shorter arm 17 of said lever may normally amount to a flexible extension of the horn 12, or its equivalent,—projecting in the general direction of the longitudinal axis thereof; and that the transverse member 22 is adapted to move from an inner position, in which it may lie immediately below one or more leaves of the spring 13, to an outer position in which it may lie almost directly below a pin 40,—by which the shackle 15 is shown as connected to the spring 13; and, in order to utilize the transverse member 22, or its equivalent, for a snubbing effect, I show the same as provided with an elastic bumper 41, in the form of a short section of heavy "rubber" hose, retained by inwardly projecting pins 42, 42'.

It will be appreciated that, by reason of the comparative length of the arm 18, normally held in an inner position by springs 19, or by equivalent means, the arm 17 may ordinarily function, during travel in a comparatively smooth road, substantially as if it were a rigid extension of the horn 12, or its equivalent; but, whenever any special obstruction or depression is encountered, tending suddenly to lift the axle 11 relatively to the horns 12, the flexibility of the described construction is such as to cause the arms 17 and 18 to move toward the respective positions indicated in dotted lines,—the extent of this movement being dependent upon the severity of the jolt received, and rebound being effectively checked by the contact of the bumper 41, or its equivalent, with the lower surface of the elliptical or semi-elliptical spring 13, or its equivalent.

This bumper may normally remain just clear of the lower surface of the mentioned spring; and the arm 18, or its equivalent, may be so curved or bent that contact of the bumper 41, or its equivalent, with said spring tends only to press said bumper into a depression 43 of the transverse member 22. It will, however, be understood that the forms and dimensions of all of the described parts may be varied within wide limits to adapt the same to use upon different types of machines and to the carrying of various loads, the mentioned arms being, however, disposed at an angle and differently inclined, and the longer arm 18 being, in all cases, resiliently held by means of a minor spring, such as the tension spring 19, provided with means for limiting its movement in at least one direction,—as by engagement of the bumper 41 beneath a major spring 13.

If desired, the bracket 26, or its equivalent, may be provided with a pivotal joint, as at 44; but means limiting the outward movement of the arm 18 may be dispensed with in case the length of said arm and the power of the spring 19 are suitably proportioned with reference to the load to be carried.

The facility with which my snubbing shock absorber may be interposed in a manner utilizing the shackles and shackle pins provided by the manufacturer of a machine, is an important feature of my invention; and although I have indicated that the minor springs 19 may come into play only to receive exceptional shocks, it will be understood that, if desired, this spring may be so proportioned as to participate even in the minor vibrations of ordinary travel, with an ordinary load.

Although I have herein described a single complete embodiment of my invention, suggesting various alternative details, it will be understood that various features of my invention are capable of independent use, and also that numerous alternative embodiments of my invention, might be devised by those skilled in the art to which this case relates, without involving the slightest departure from the spirit and scope of my invention, as the same is indicated above and in the following claims.

I claim as my invention:

1. In a shock absorbing device for use upon vehicles comprising major springs secured to axles and connected by shackles with frame elements whose axes are downwardly inclined; a lever element comprising a longer arm and a shorter arm and provided with means for its pivotal attachment in place of a shackle,—the shorter arm of said lever constituting an extension of said frame element, and the longer arm thereof being downwardly inclined and resiliently held, said lever comprising side elements spaced apart sufficiently to permit said major spring to play therebetween.

2. In a shock absorbing device for use upon vehicles comprising major springs secured to axles and connected by shackles with frame elements whose axes are downwardly inclined; a lever element comprising a longer arm and a shorter arm and provided with means for its pivotal attachment in place of a shackle,—the shorter arm of said lever constituting an extension of said frame element, and the longer arm thereof being downwardly inclined and resiliently held, said lever comprising side elements which are spaced apart sufficiently to permit said major spring to play therebetween but are connected at their ends by transverse members.

3. In a shock absorbing device for use upon vehicles comprising major springs secured to axles and connected by shackles with frame elements whose axes are downwardly inclined; a lever element comprising a longer arm and a shorter arm and provided with means for its pivotal attachment in place of a shackle,—the shorter arm of said lever constituting an extension of said frame element, and the longer arm thereof being downwardly inclined and resiliently held, said lever comprising side elements spaced apart sufficiently to permit said major spring to play therebetween but connected at their ends by transverse members, an upper transverse member being apertured to receive a shackle pin.

4. In a shock absorbing device for use upon vehicles comprising major springs secured to axles and connected by shackles with frame elements whose axes are downwardly inclined; a lever element comprising a longer arm and a shorter arm and provided with means for its pivotal attachment in place of a shackle,—the shorter arm of said lever constituting an extension of said frame element, and the longer arm thereof being downwardly inclined and resiliently held, said lever comprising side elements spaced apart sufficiently to permit said major spring to play therebetween, said lever being secured to a frame element by apertured ears spaced apart by a distance corresponding to the internal diameter of the displaced shackle.

5. In a shock absorbing device for use upon vehicles comprising major springs secured to axles and connected by shackles with frame elements whose axes are downwardly inclined; a lever element comprising a longer arm and a shorter arm and provided with means for its pivotal attachment in place of a shackle,—the shorter arm of said lever constituting an extension of said frame element, and the longer arm thereof being downwardly inclined and resiliently held, said lever comprising side elements spaced apart sufficiently to permit said major spring to play therebetween but connected at their ends by transverse members, a lower transverse member being provided with bumper means limiting the relative movement between the same and the major spring.

In testimony whereof, I have hereunto set my hand at Los Angeles, California, this 19th day of March 1926.

ROSS T. ROBERSON.